US012603362B2

(12) United States Patent
Hwang et al.

(10) Patent No.: US 12,603,362 B2
(45) Date of Patent: Apr. 14, 2026

(54) LITHIUM SECONDARY BATTERY AND BATTERY SYSTEM INCLUDING THE SAME

(71) Applicant: SK ON CO., LTD., Seoul (KR)

(72) Inventors: Chang Mook Hwang, Daejeon (KR); Sin Young Moon, Daejeon (KR); Jong Hyeok Lee, Daejeon (KR); Yoon Ji Jo, Daejeon (KR)

(73) Assignee: SK ON CO., LTD., Seoul (KR)

( * ) Notice: Subject to any disclaimer, the term of this patent is extended or adjusted under 35 U.S.C. 154(b) by 707 days.

(21) Appl. No.: 17/961,387

(22) Filed: Oct. 6, 2022

(65) Prior Publication Data

US 2023/0116666 A1 Apr. 13, 2023

(30) Foreign Application Priority Data

Oct. 8, 2021 (KR) ........................ 10-2021-0134074

(51) Int. Cl.
| | |
|---|---|
| *H01M 50/105* | (2021.01) |
| *H01M 10/052* | (2010.01) |
| *H01M 10/42* | (2006.01) |
| *H01M 10/48* | (2006.01) |
| *H01M 50/178* | (2021.01) |
| *H01M 50/211* | (2021.01) |
| *H01M 50/538* | (2021.01) |
| *H01M 50/569* | (2021.01) |

(52) U.S. Cl.
CPC ....... *H01M 50/105* (2021.01); *H01M 10/052* (2013.01); *H01M 10/425* (2013.01); *H01M 10/48* (2013.01); *H01M 50/178* (2021.01); *H01M 50/211* (2021.01); *H01M 50/538* (2021.01); *H01M 50/569* (2021.01)

(58) Field of Classification Search
CPC ............. H01M 50/105; H01M 50/178; H01M 50/531–54; H01M 50/569; H01M 10/48–482
See application file for complete search history.

(56) References Cited

U.S. PATENT DOCUMENTS

| | | | | |
|---|---|---|---|---|
| 6,387,566 B1* | 5/2002 | Chang | ................. | H01M 50/178 429/161 |
| 2009/0246607 A1* | 10/2009 | Shinyashiki | ............ | B32B 27/08 320/137 |
| 2014/0065453 A1* | 3/2014 | Schaefer | .............. | H01M 10/48 429/61 |

FOREIGN PATENT DOCUMENTS

| | | | | | |
|---|---|---|---|---|---|
| JP | 2007066612 | A | * | 3/2007 | |
| KR | 10-2007-0075927 | A | | 7/2007 | |
| KR | 10-1351427 | B1 | | 1/2014 | |
| KR | 20170111750 | A | * | 10/2017 | .......... H01M 2/0275 |
| KR | 10-1950463 | B1 | | 2/2019 | |

(Continued)

*Primary Examiner* — Robert S Carrico
(74) *Attorney, Agent, or Firm* — Perkins Coie LLP

(57) ABSTRACT

A lithium secondary battery according to embodiments of the disclosed technology includes a pouch that includes a first pouch case including a first peripheral portion and a first conductive unit formed at the first peripheral portion, and a second pouch case including a second peripheral portion and a second conductive unit formed at the second peripheral portion, the second pouch case being sealed with the first pouch case, and an electrode assembly accommodated in the pouch. The first conductive unit and the second conductive unit are in contact with each other to form an electric circuit along the first peripheral portion or the second peripheral portion.

16 Claims, 5 Drawing Sheets

(56) References Cited

FOREIGN PATENT DOCUMENTS

| KR | 10-2019-0023648 A | 3/2019 |
| KR | 10-2019-0031141 A | 3/2019 |

* cited by examiner

LITHIUM SECONDARY BATTERY AND BATTERY SYSTEM INCLUDING THE SAME

CROSS-REFERENCE TO RELATED APPLICATION

This patent document claims priority to Korean Patent Application No. 10-2021-0134074 filed on Oct. 8, 2021 in the Korean Intellectual Property Office (KIPO), the entire disclosure of which is incorporated by reference herein.

BACKGROUND

1. Field

The technology disclosed in this patent document relates to a lithium secondary battery and a battery system including the same. More particularly, the disclosed technology relates to a lithium secondary battery including a first pouch case and a second pouch case and a battery system including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Further, a battery pack including the secondary battery is being developed and applied to a power source of an eco-friendly vehicle such as a hybrid vehicle.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for housing the electrode assembly and the electrolyte.

A lithium secondary batteries contains a lithium salt such as $LiPF_6$ and $LiBF_4$ in the electrolyte. When fluorine (F) contained in the lithium salt reacts with moisture, fluoric acid (HF) is generated. Fluoric acid accelerates a solvent decomposition reaction in the electrolyte to cause an electrode corrosion. Further, swelling due to an internal side reaction may be caused to increase an internal pressure of the battery.

For example, Korean Published Patent Publication No. 2019-0031141 discloses a non-aqueous electrolyte containing a fluoric acid sensing agent. However, the fluoric acid sensing agent has a sensitivity only to fluoric acid, and defects may be caused by a side reaction of the fluoric acid sensing agent. Additionally, a transparent identification unit for visually observing a discoloration of the fluoric acid sensing agent is added to a pouch, thereby degrading mechanical properties of the pouch

SUMMARY

According to an aspect of the disclosed technology, there is provided a lithium secondary battery having improved operational reliability and stability.

According to an aspect of the disclosed technology, there is provided a battery system having improved operational reliability and stability.

A lithium secondary battery according to exemplary embodiments of the disclosed technology includes a pouch and an electrode assembly accommodated in the pouch. The pouch includes a first pouch case including a first peripheral portion and a first conductive unit formed at the first peripheral portion, and a second pouch case including a second peripheral portion and a second conductive unit formed at the second peripheral portion. The second pouch case is sealed with the first pouch case. The first conductive unit and the second conductive unit are in contact with each other to form an electric circuit along the first peripheral portion or the second peripheral portion.

In some embodiments, the first conductive unit may include two or more first conductive patterns spaced apart from each other, and the second conductive unit may include two or more second conductive patterns spaced apart from each other. At least a portion of the first conductive patterns and at least a portion of the second conductive patterns may be electrically connected to each other.

In some embodiments, the first conductive patterns and the second conductive patterns may be arranged to partially overlap each other in a plan view to form a complete circuit in a sealed state of the first pouch case and the second pouch case.

In some embodiments, at least one of the first conductive patterns and at least one of the second conductive patterns may be exposed to an outside of the first pouch case and the second pouch case.

In some embodiments, a distance between the first conductive patterns may be from 1 mm to 10 mm, and a distance between the second conductive patterns may be from 1 mm to 10 mm.

In some embodiments, each of the first conductive patterns may have a length ranging from 1 mm to 10 mm, and each of the second conductive patterns may have a length ranging from 1 mm to 10 mm.

In some embodiments, a first insulator may be formed between the first conductive patterns, and a second insulator may be formed between the second conductive patterns.

In some embodiments, each of the first conductive patterns, the first insulator, the second conductive patterns and the second insulator may have a thickness ranging from 10 μm to 40 μm.

In some embodiments, the first conductive unit may be partially inserted into the first peripheral portion, and the second conductive unit may be partially inserted into the second peripheral portion.

In some embodiments, an insertion depth of each of the first conductive portion and the second conductive portion may be from 5 μm to 10 μm.

In some embodiments, the first pouch case and the second pouch case may include a first accommodating portion and a second accommodating portion, respectively, which protrude to an outside of the pouch to accommodate the electrode assembly.

In some embodiments, the first conductive unit and the second conductive unit may at least partially surround perimeters of the first accommodating portion and the second accommodating portion, respectively.

In some embodiments, the first pouch case and the second pouch case may be sealed to each other through four sides of the pouch, and the first conductive unit and the second conductive unit may extend along four sides of the first peripheral portion and the second peripheral portion, respectively, to surround perimeters of the first accommodating portion and the second accommodating portion.

In some embodiments, the first pouch case and the second pouch case may be sealed to each other through three sides of the pouch, and the first conductive unit and the second conductive unit may extend along three sides of the first peripheral portion and the second peripheral portion, respectively, to partially surround perimeters of the first accommodating portion and the second accommodating portion.

In some embodiments, an electrode lead may be connected to the electrode assembly to be exposed to an outside of the pouch. The electrode lead may be fused together with the first peripheral portion of the first pouch case and the second peripheral portion of the second pouch case.

A battery system according to exemplary embodiments of the disclosed technology includes a plurality of battery cells and a power supply. Each of the battery cells includes a pouch and an electrode assembly accommodated in the pouch. The pouch includes a first pouch case including a first peripheral portion and a first conductive unit formed at the first peripheral portion, and a second pouch case including a second peripheral portion and a second conductive unit formed at the second peripheral portion. The second pouch case is sealed with the first pouch case. The power supply applies a current to the first conductive unit or the second conductive unit from an outside of at least one battery cell of the plurality of battery cells.

The first conductive unit and the second conductive unit are in contact with each other to form an electric circuit along the first peripheral portion or the second peripheral portion, and the current is circulated through the electric circuit.

In some embodiments, a ventilation generated in the battery cell is detected based on a change of the current in the electric circuit formed by the first conductive unit and the second conductive unit.

A lithium secondary battery according to exemplary embodiments of the disclosed technology may be formed by bonding a first pouch case including a first conductive unit and a second pouch case including a second conductive unit. The first conductive unit and the second conductive unit may contact each other to form one electric circuit.

In exemplary embodiments, a separation of the first conductive unit and the second conductive unit may cause a change in the electric circuit, and the change in the electric circuit caused by the separation of the first conductive unit and the second conductive unit may be detected by using an ammeter or a voltmeter. Thus, an excessive generation of gas in the pouch may be detected based on a local electrical circuit change.

In some embodiments, the first conductive unit and the second conductive unit may include first conductive patterns and second conductive patterns, respectively, which may be spaced apart from each other. Ends of the first conductive patterns and the second conductive patterns may be in contact with or electrically connected to each other to form one electrical circuit.

In some embodiments, the first conductive patterns and the second conductive patterns may be alternately disposed to form an electric circuit. Accordingly, ventilation may be quickly detected to identify the ventilated location at an early stage.

DETAILED DESCRIPTION OF THE EMBODIMENTS

According to exemplary embodiments, a lithium secondary battery including a pouch that includes a conductive unit. According to exemplary embodiments, a battery system including the lithium secondary battery is also provided.

The term "peripheral portion" as used herein may refer to regions in contact with each other among regions of first or second pouch cases. A region in which a first peripheral portion of the first pouch case and the second peripheral portion of the second pouch case are bonded to each other may be referred to as a "sealing region." The first peripheral portion and the second peripheral portion may be formed symmetrically to each other.

The terms "outside" or "outer" as used herein may refer to a surface exposed to an outside of the pouch after the first pouch case and the second pouch case are bonded to form a single pouch.

The terms "inside" or "inner" as used herein may refer to a surface that is not exposed to the outside of the pouch after the first pouch case and the second pouch case are bonded to form a single pouch. For example, the terms "inside" or "inner" may be used to refer to an inner surface of each pouch case.

Hereinafter, the disclosed technology will be described in detail with reference to the accompanying drawings. However, those skilled in the art will appreciate that such embodiments described with reference to the accompanying drawings are provided to further understand the spirit of the disclosed technology and do not limit subject matters to be protected as disclosed in this patent document.

Figure 1:
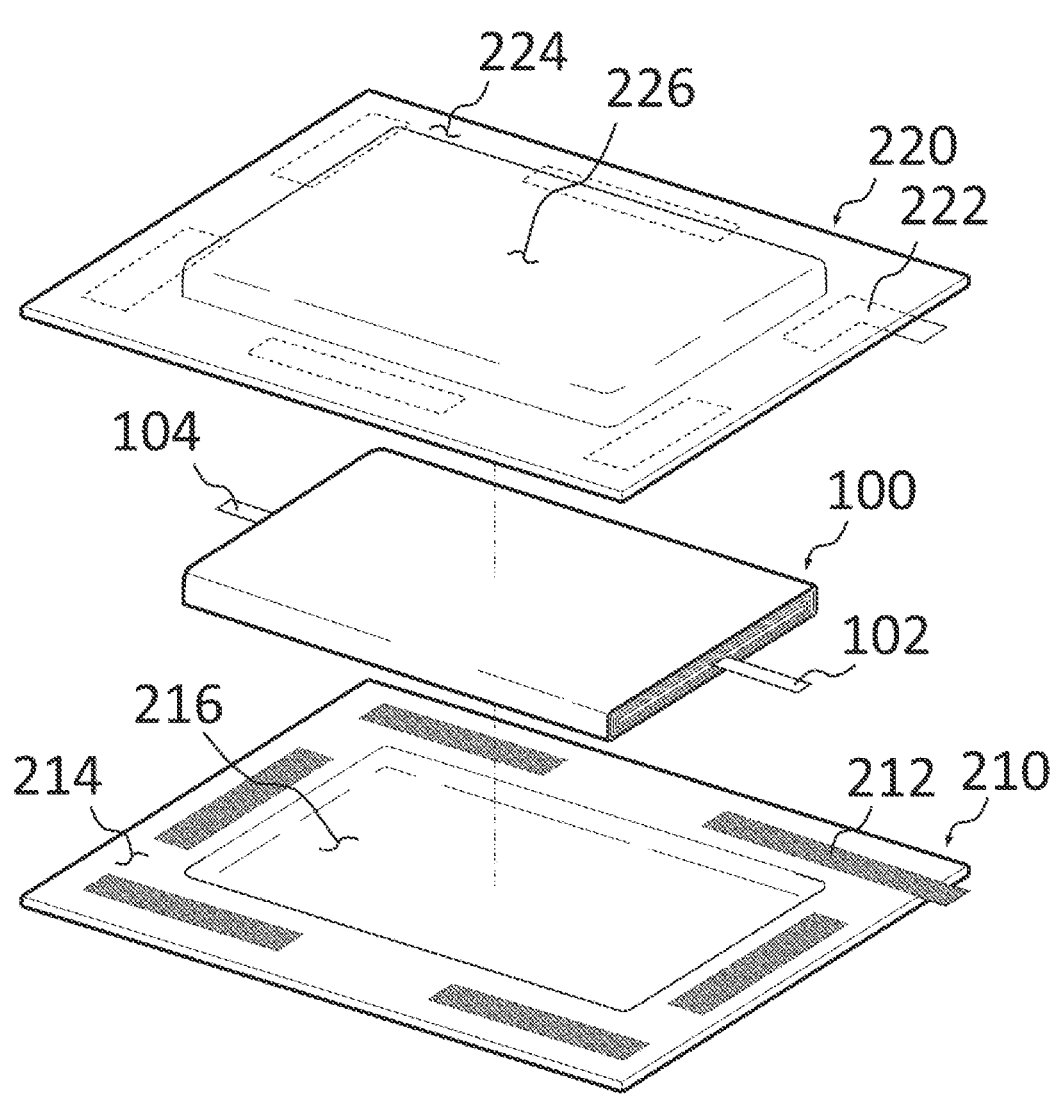
FIGS. 1 to 3 are schematic perspective views illustrating a state before a pouch for a lithium secondary battery is sealed in accordance with exemplary embodiments.
Figure 2:
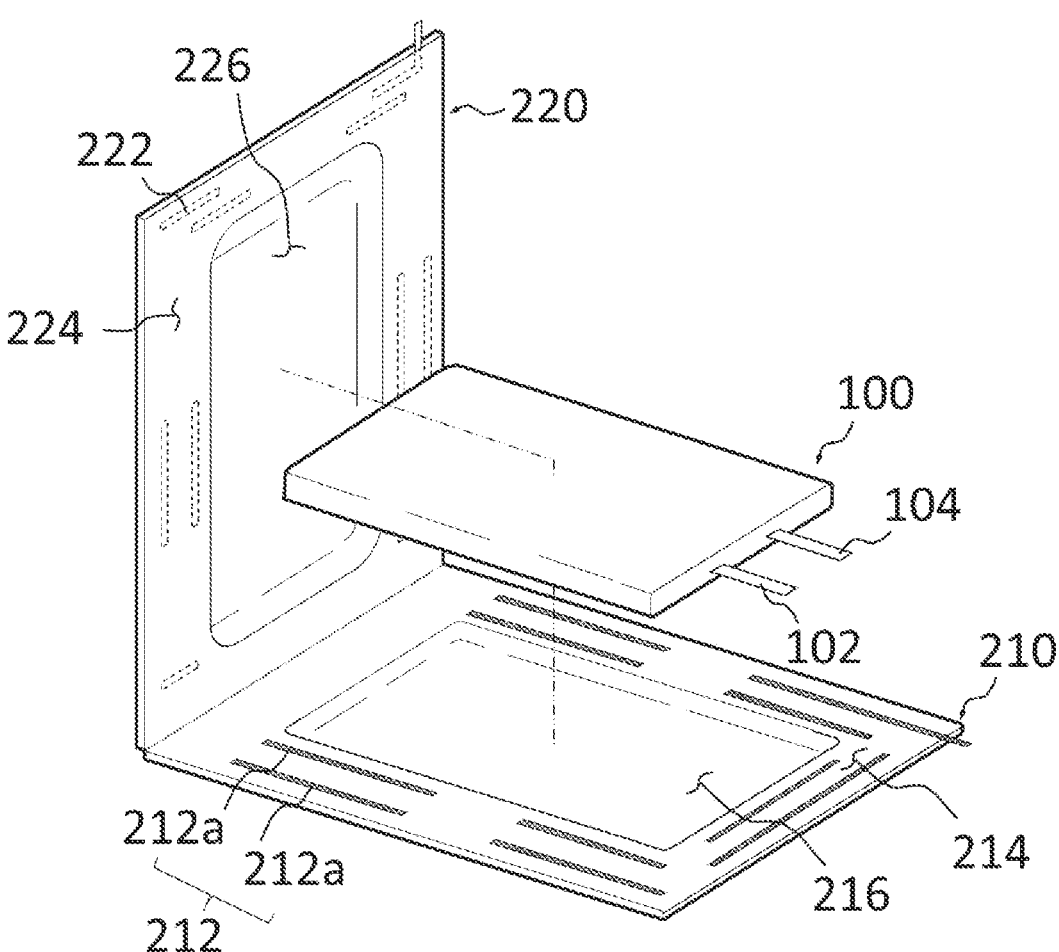
Figure 3:
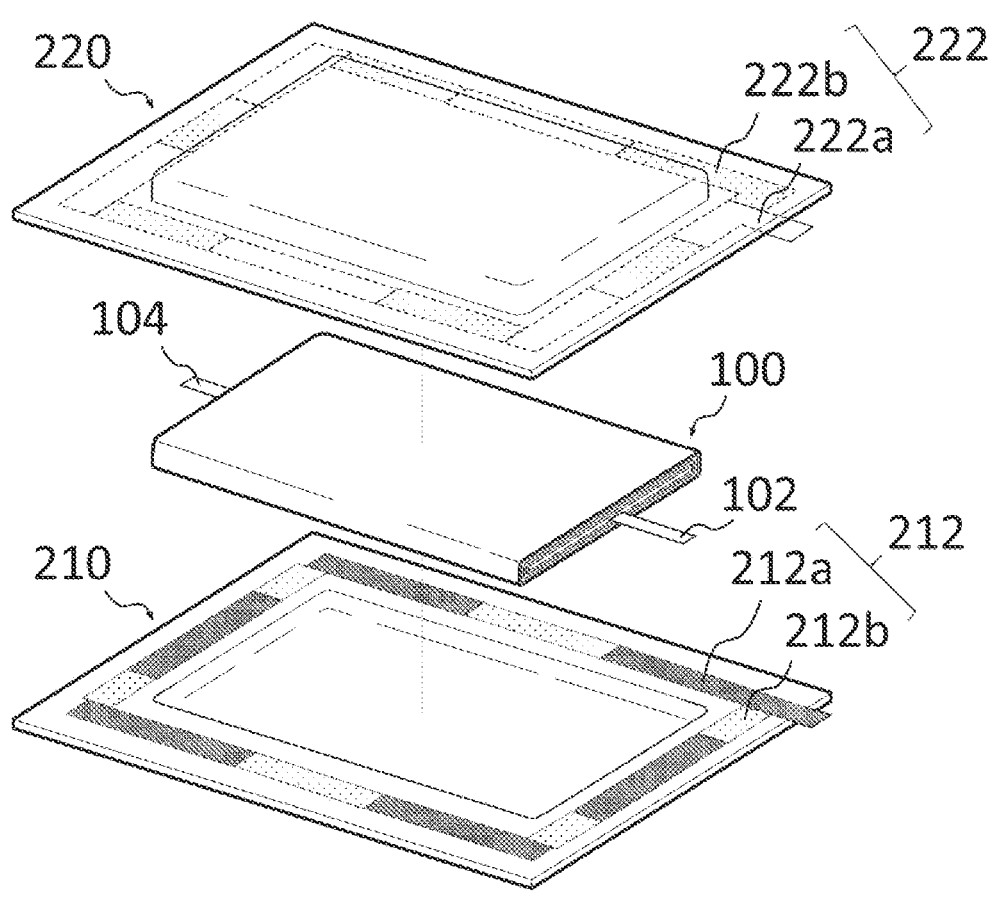

FIGS. 1 to 3 are schematic perspective views illustrating a state before a pouch for a lithium secondary battery is sealed in accordance with exemplary embodiments.

Referring to FIGS. 1 and 2, a pouch for a lithium secondary battery according embodiments of the disclosed technology includes a first pouch case 210 and a second pouch case 220, and outer shapes of the first pouch case 210 and the second pouch case 220 may be substantially the same. The first pouch case 210 includes a first accommodating portion 216 and a first peripheral portion 214 formed around the first accommodating portion 216. The second pouch case 220 includes a second accommodating portion 226 and a second peripheral portion 224 formed around the second accommodating portion 226.

A first conductive unit 212 is formed at the first peripheral portion 214 of the first pouch case 210, and a second conductive unit 222 is formed at the second peripheral portion 224 of the second pouch case 220.

The first conductive unit 212 may include a plurality of first conductive patterns 212a, and the second conductive unit 222 may include a plurality of second conductive patterns 222a. The first conductive patterns 212a may be spaced apart from each other to form the first conductive unit 212. The second conductive patterns 222a may be spaced apart from each other to form the second conductive unit 222.

Shapes of the first conductive patterns 212a and the second conductive patterns 222a are not particularly limited, and may have a polygonal shape or a mesh shape.

The lithium secondary battery may include a pouch formed by bonding the first pouch case 210 and the second pouch case 220 to each other, and an electrode assembly 100. The electrode assembly 100 may be accommodated in the pouch in accommodating portions 216 and 226.

In some embodiments, the first pouch case 210 and the second pouch case 220 may be disposed above and below the electrode assembly 100 in a state separated from each other. After receiving the electrode assembly 100 in the accommodating portions 216 and 226, the first pouch case 210 and the second pouch case 220 may be sealed using four sides of the first peripheral portion 214 and the second peripheral portion 224.

The electrode assembly 100 may include repeatedly stacked electrodes and a separation layer disposed between the electrodes. Each of the electrodes may include an active material layer formed on an electrode current collector. The electrodes may include an anode and a cathode.

The cathode may include a cathode current collector and a cathode active material layer formed by coating a cathode active material on the cathode current collector. The cathode active material may include a compound capable of reversibly intercalating and de-intercalating lithium ions.

In exemplary embodiments, the cathode active material may include lithium-transition metal composite oxide particles. For example, the lithium-transition metal composite oxide particles may be represented by Chemical Formula 1 below.

$$Li_xNi_{1-y}M_yO_{2-z}X_z \qquad \text{[Chemical Formula 1]}$$

In Chemical Formula 1, $0.9 \leq x \leq 1.1$, $0 \leq y \leq 0.7$, and $-0.1 \leq z \leq 0.1$. M may represent at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn or Zr. X may represent at least one element selected from O, F, S and P.

In an embodiment, a molar ratio (1-y) of nickel in Chemical Formula 1 may be in a range from 0.8 to 0.95. In this case, power and capacity may be increased using a high-nickel (High-Ni) cathode composition.

Additionally, the lithium-transition metal composite oxide particles may be represented by Chemical Formula 2 below, and may have an olivine structure.

$$LiMPO4 \qquad \text{[Chemical Formula 2]}$$

In Chemical Formula 2, M may be at least one element selected from Fe, Mn, Ni, Co and V.

The cathode current collector may include a metallic material that may not be reactive in a charge/discharge voltage range of the lithium secondary battery, and may be easily coated and adhered to the electrode active material. For example, the cathode current collector may include, e.g., aluminum or an aluminum alloy.

A slurry may be prepared by mixing and stirring the cathode active material with a binder, a conductive material and/or a dispersive agent in a solvent. The slurry may be coated on the cathode current collector, and then dried and pressed to form the cathode including the cathode active material layer.

The binder may include an organic based binder or an aqueous based binder such as styrene-butadiene rubber (SBR) that may be used with a thickener such as carboxymethyl cellulose (CMC).

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material including, e.g., $LaSrCoO_3$, $LaSrMnO_3$, etc.

The anode may include an anode current collector and an anode active material layer formed by coating an anode active material on the anode current collector.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, a silicon (Si)-based compound, etc., may be used.

In some embodiments, the anode active material may include the silicon-based active material to provide a high-capacity lithium secondary battery. The silicon-based active material may include SiOx ($0<x<2$) or SiOx ($0<x<2$) containing a lithium compound.

The anode current collector may include gold, stainless steel, nickel, aluminum, titanium, copper or an alloy thereof, preferably may include copper or a copper alloy.

For example, a slurry may be prepared by mixing and stirring the anode active material with a binder, a conductive material, a thickener, etc., in a solvent. The slurry may be coated on the anode current collector, and then dried and pressed to form the anode including the anode active material layer.

The binder and the conductive material substantially the same as or similar to those used for forming the cathode may be used in the anode.

The separation layer may be interposed between the cathode and the anode. The separation layer include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like.

In exemplary embodiments, an electrode cell may be defined by the cathode, the anode and the separation layer, and a plurality of the electrode cells may be stacked to form the electrode assembly. The battery cell may be accommodated together with an electrolyte in the pouch to define the secondary battery. In exemplary embodiments, a non-aqueous electrolyte may be used as the electrolyte.

The non-aqueous electrolyte solution may include a lithium salt and an organic solvent.

The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3$ $(CF_2)_7SO_3^-$, $CF_3CO_2^-$, $CH_3CO_2$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

A notched portion (not illustrated) may be formed from at least one end portion of the electrode current collector. The notched portion may serve as, e.g., an electrode tab. The notched portion may include a cathode notched potion (e.g., a cathode tab) protruding from the cathode current collector and an anode notched portion (e.g., an anode tab) protruding from the anode current collector.

The electrode tabs may be electrically connected to electrode leads 102 and 104 exposed to an outside of the pouch. The electrode leads may include a cathode lead 102 and an anode lead 104 connected to the cathode tab and the anode tab, respectively.

To prevent an electrical short circuit, an insulating member (e.g., an insulating tape) may be formed on a partial region of each of the electrode leads 102 and 104. When the insulating member is formed on each of the electrode leads 102 and 104, a third conductive pattern (not illustrated) may be formed on the insulating member. The third conductive pattern may be electrically connected to the first conductive unit 212 and the second conductive unit 222 to form an electric circuit.

In some embodiments, an end portion of the first conductive unit 212 and/or an end portion of the second conductive unit 222 may be exposed to the outside of the pouch.

As illustrated in FIG. 1, the cathode lead 102 and the anode lead 104 may be disposed at opposite sides of the electrode assembly 100.

As illustrated in 1, the electrode assembly 100 may have a wound type structure. The electrode assembly 100 may also have, e.g., a stacked structure or a jelly-roll structure by folding.

As illustrated in FIG. 2, the first pouch case 210 and the second pouch case 220 may be prepared as an integral member. In this case, the first pouch case 210 and the second pouch case 220 may be integrally connected at one side of each of the first peripheral portion 214 and the second peripheral portion 224. After accommodating the electrode assembly 100 in the accommodating portions 216 and 226, the first pouch case 210 and the second pouch case 220 may be sealed using remaining three sides of the first peripheral portion 214 and second peripheral portion 224.

In some embodiments, the cathode lead 102 and the anode lead 104 may be disposed at the same side of the electrode assembly 100.

As illustrated in FIG. 2, two or more first conductive patterns 212a may be parallel to each other to form the first conductive unit 212, and two or more second conductive patterns may be parallel to each other to form the second conductive unit 222.

The first conductive unit 212 and the second conductive unit 222 may be formed at the peripheral portions 214 and 224 of each of the pouch cases 210 and 220. As illustrated in FIG. 1, the conductive units 212 and 222 may be formed at four sides of the peripheral portions 214 and 224. As illustrated in FIG. 2, the conductive units 212 and 222 may be formed at three sides of the peripheral portions 214 and 224 excluding one side at which the pouch cases are integrally connected among four sides. The three sides may form a sealing portion, and each of the electrode leads 102 and 104 may be fused together with the peripheral portions 214 and 224 of the first pouch case 210 and the second pouch case 220.

In some embodiments, the first conductive unit 212 and the second conductive unit 222 may have the same shape, and only one of the first pouch case 210 and the second pouch case 220 may have an accommodating portion for the electrode assembly 100. In this case, the pouch case that may not include the accommodating portion for the electrode assembly 100 may be prepared in a plate shape that does not include a region protruding to an outside.

Each of the pouch cases 210 and 220 may include an inner resin layer and an outer resin layer, and may further include a metal layer between the inner resin layer and the outer resin layer. The metal layer may include aluminum or an aluminum alloy. In this case, the thin type pouch cases 210 and 220 may be easily implemented, and heat resistance and mechanical durability of the pouch may be improved.

The conductive units 212 and 222 may be included in the inner resin layer located at the peripheral portion of the pouch cases 210 and 220. In an embodiment, the conductive units 212 and 222 may not be exposed in an inner direction of the pouch. In an embodiment, the conductive units 212 and 222 may be exposed in the inner direction of the pouch.

The inner resin layer may include a polymer resin having enhanced electrolyte resistance. For example, the inner resin layer may include a polyolefin resin, a copolymer of ethylene and an acrylic acid, a copolymer of propylene and an acrylic acid, etc. Examples of the polyolefin resin may include unstretched polypropylene, polypropylene-butylene-ethylene terpolymer, polypropylene, a chlorinated polypropylene (CPP) resin, polyethylene, ethylene propylene copolymer, etc.

The outer resin layer may include, e.g., polyethylene, polypropylene, polyethylene terephthalate, nylon, a low density polyethylene (LDPE), a high density polyethylene (HDPE), a linear low density polyethylene (LLDPE), etc. These may be used alone or in a combination thereof.

Each thickness of the inner resin layer or the outer resin layer may be from 5 μm to 100 μm, e.g., from 10 μm to 80 μm.

In some embodiments, the conductive units 212 and 222 included in each of the pouch cases 210 and 220 may be located at an outside of the outer resin layer.

The conductive units 212 and 222 included in each of the pouch cases 210 and 220 may include a conductive material, e.g., a metallic material such as a metal, a metal nanowire, a metal oxide, carbon nanotube, graphene, a conductive polymer, etc.

Examples of the metallic material include gold (Au), platinum (Pt), silver (Ag), aluminum (Al), copper (Cu), chromium (Cr), iron (Fe), nickel (Ni), titanium (Ti) , tungsten (W), zinc (Zn), lead (Pb), palladium (Pd), molybdenum (Mo), or an alloy thereof.

The metal oxide may include indium tin oxide (ITO), indium zinc oxide (IZO), indium zinc tin oxide (IZTO), aluminum zinc oxide (AZO), gallium zinc oxide (GZO), fluorine tin oxide (FTO), zinc oxide (ZnO), indium tin oxide-silver-indium tin oxide (ITO-Ag-ITO), indium zinc oxide-silver-indium zinc oxide (IZO-Ag-IZO), indium zinc tin oxide-silver-indium zinc tin oxide (IZTO-Ag-IZTO), aluminum zinc oxide-silver-aluminum zinc oxide (AZO-Ag-AZO), etc. These may be used alone or in combination thereof.

The conductive polymer may include poly(3,4-ethylenedioxythiophene) (PEDOT) and/or PEDOT:polystyrenesulfonate (PS S), polyimide, polypyrrole, polythiophene, polyacetylene, polyaniline, etc.

Referring to FIG. 3, the first conductive unit 212 and the second conductive unit 222 may further include a first insulator 212b and a second insulator 222b, respectively. For example, the first conductive patterns 212a and the first insulators 212b may be alternately disposed, and the second conductive patterns 222a and the second insulators 222b may be alternately disposed.

In some embodiments, the first conductive pattern 212a and the first insulator 212b may have the same thickness, and the second conductive pattern 222a and the second insulator 222b may have the same thickness.

In some embodiments, the first conductive patterns 212a, the second conductive patterns 222a, the first insulators 212b and the second insulators 222b may be arranged such that at least one of the first conductive patterns 212a may be electrically connected to or in contact with at least one of the second conductive patterns 222a after the first pouch case 210 and the second pouch case 220 are bonded to each other.

In some embodiments, each thickness of the first conductive pattern 212a, the first insulator 212b, the second conductive pattern 222a and the second insulator 222b may be in a range from 10 μm to 40 μm. In the above range, damages of the conductive patterns 212a and 222a due to electrical and mechanical stress may be prevented without causing irregularities on the outside of the pouch.

In some embodiments, the first conductive pattern 212a, the first insulator 212b, the second conductive pattern 222a and the second insulator 222b may have the same thickness.

In some embodiments, a spacing separation distance between the first conductive patterns 212a may be in a range from 0.1 mm to 10 mm, and a spacing distance between the second conductive patterns 222a may be in a range from 0.1 mm to 10 mm. Preferably, the spacing distances between the first conductive patterns 212a or the second conductive patterns 222a may each be in a range from 0.5 mm to 5 mm, more preferably from 1 mm to 3 mm.

In some embodiments, a length of each of the first conductive patterns 212a may be in a range from 0.1 mm to 10 mm, and a length of each of the second conductive patterns 222a may be in a range from 0.1 mm to 10 mm. The length may refer to a length in a direction parallel to the peripheral portions 214 and 224. Preferably, the length of each of the first conductive patterns 212a or the second conductive patterns 222a may be in a range from 0.5 mm to 5 mm, more preferably from 1 mm to 3 mm.

In the above length/width range, an appropriate fusion area may be achieved to enhance a sealing strength of the pouch while maintaining sensitivity of a ventilation detection.

In some embodiments, the first conductive unit 212 may be inserted to an inner region of the first peripheral portion 214 of the first pouch case 210, and an insertion depth in a depth direction of the first peripheral portion 214 may be in a range from 5 μm to 10 μm.

The second conductive unit 222 may be inserted to an inner region of the second peripheral portion 224 of the second pouch case 220, and an insertion depth in a depth direction of the second peripheral portion 224 may be in a range from 5 μm to 10 μm.

For example, the conductive units 212 and 222 may be attached to an inner side or an outer side of the peripheral portions 214 and 224 of the pouch cases 210 and 220 using an adhesive or through a heat sealing process.

Figure 4:
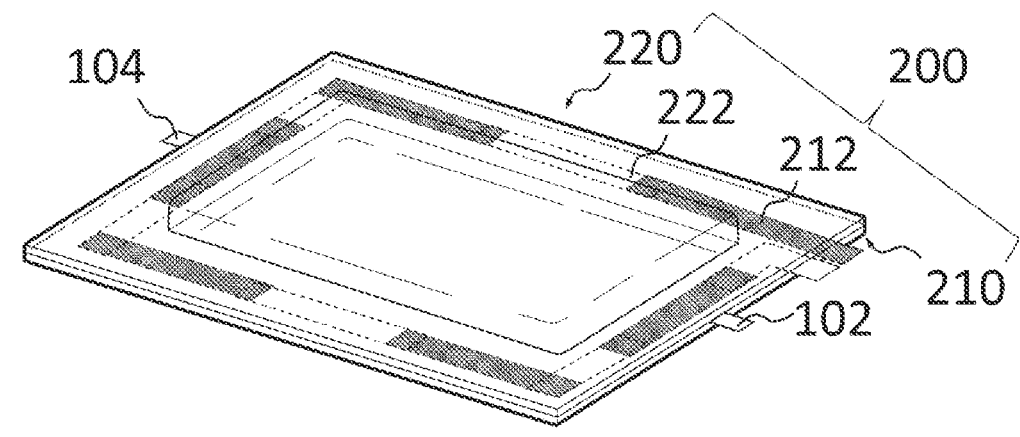
FIGS. 4 and 5 are schematic perspective views illustrating a state after a pouch for a lithium secondary battery is sealed in accordance with exemplary embodiments.
Figure 5:
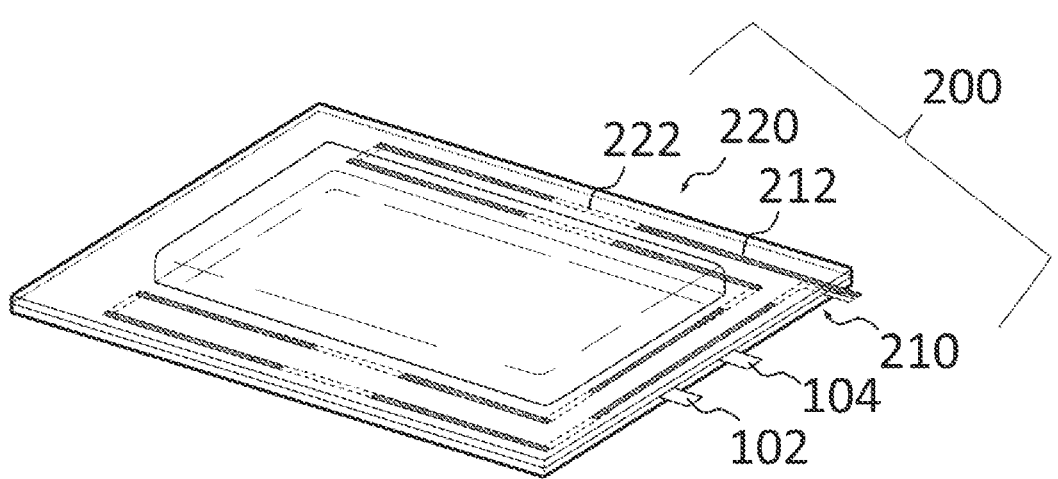

FIGS. 4 and 5 are schematic perspective views illustrating a state after a pouch for a lithium secondary battery is sealed in accordance with exemplary embodiments.

Referring to FIGS. 4 and 5, the first peripheral portion 214 of the first pouch case 210 and the second peripheral portion 224 of the second pouch case 220 may be bonded to each other to seal the pouch 200.

In exemplary embodiments, a portion of the first conductive unit 212 formed at the first peripheral portion 214 and a portion of the second conductive unit 222 formed at the second peripheral portion 224 may overlap each other. For example, at least a portion of the first conductive patterns 212a included in the first conductive unit 212 and at least a portion of the second conductive patterns 222a included in the second conductive unit 222 may overlap each other.

Accordingly, the first conductive unit 212 and the second conductive unit 222 may form an electric circuit disposed along a periphery of the pouch 200.

The first conductive pattern 212a and the second conductive pattern 222a may be partially exposed to the outside of the pouch. A current applied to an exposed end of the first conductive pattern 212a may circulate along the periphery of the pouch and may be detected at an exposed end of the second conductive pattern 222a.

As illustrated in FIG. 4, the current applied through the electrical circuit formed along four sides of the peripheral portions 214 and 224 of the pouch 200 may circulate through the peripheral portions 214 and 224.

As illustrated in FIG. 5, the current applied through the electric circuit formed along three sides of the peripheral portions 214 and 224 of the pouch 200 may circulate through the peripheral portions 214 and 224.

In exemplary embodiments, a current may be applied to the electric circuit formed by the first conductive unit 212 and the second conductive unit 222, and a separation between the first pouch case 210 and the second pouch case 220 may be detected.

Figure 6:
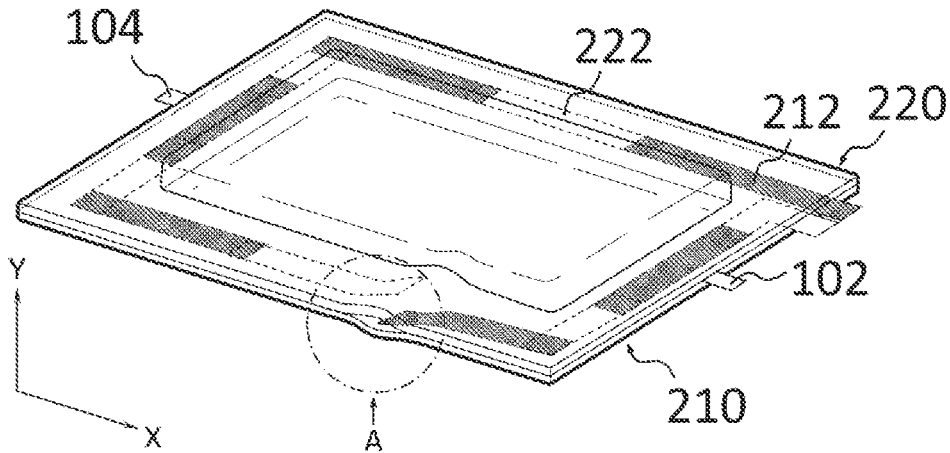
FIGS. 6 and 7 are a schematic perspective view and a schematic cross-sectional view illustrating a state where a ventilation occurs in a pouch for a lithium secondary battery in accordance with exemplary embodiments.
Figure 7:
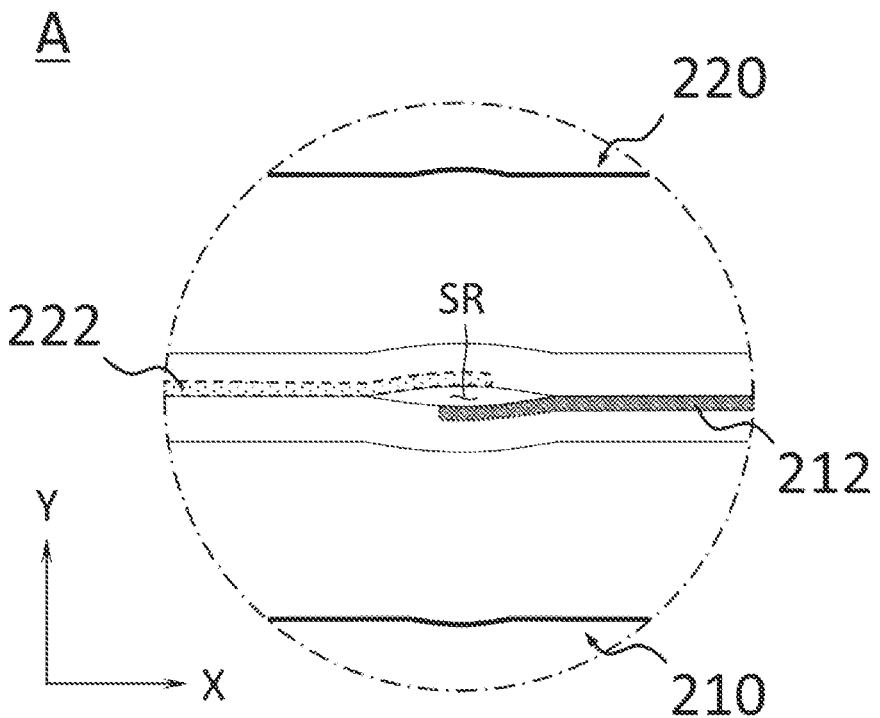

FIGS. 6 and 7 are a schematic perspective view and a schematic cross-sectional view illustrating a state where a ventilation occurs in a pouch for a lithium secondary battery in accordance with exemplary embodiments. FIG. 7 is an enlarged view of a region A of FIG. 6.

Referring to FIGS. 6 and 7, a separation between the first conductive unit 212 and the second conductive unit 222 may occur in advance to a complete ventilation of the pouch 200. Accordingly, as illustrated in FIG. 7, a separation region SR may be generated between the first conductive unit 212 and the second conductive unit 222.

When the separation occurs between the first conductive unit 212 and the second conductive unit 222, a contact area of the first conductive unit 212 and the second conductive unit 222 forming the electric circuit may be reduced, and an electric resistance of the circuit may be increased. Accordingly, a change of a current value in the electric circuit may be induced.

When the complete ventilation occurs, a complete separation of the electric circuit formed by the first conductive unit 212 and the second conductive unit 222 may occur. Accordingly, an amount of gas generated at an inside pouch may be predicted based on a degree of recovery of the current applied to the electric circuit.

The battery system according to embodiments of the disclosed technology includes a plurality of battery cells each including the pouch 200 and the electrode assembly 100 according to the above-described embodiments, and a power supply applying a current to the first conductive unit or the second conductive unit from an outside of at least one of the plurality of battery cells.

A change of the current applied by the power supply may be detected by a current detecting sensor (not illustrated) or a voltage detecting sensor (not illustrated) located at the outside of the pouch. The current detecting sensor may measure the recovered amount of the current applied to the first conductive unit 212 or the second conductive unit 222 to detect the ventilation occurring at the peripheral portion of the pouch.

Therefore, an inspection of a degree of gas generation at the inside of the pouch, adhesive strength and durability of a bonding region, etc., may be performed in a non-destructive method.

What is claimed is:

1. A lithium secondary battery, comprising:

a pouch comprising:

a first pouch case comprising a first peripheral portion and a first conductive unit formed at the first peripheral portion; and a second pouch case comprising a second peripheral portion and a second conductive unit formed at the second peripheral portion, the second pouch case being sealed with the first pouch case; and an electrode assembly accommodated in the pouch, wherein the first conductive unit and the second conductive unit are in contact with each other to form an electric circuit along the first peripheral portion or the second peripheral portion, wherein the first conductive unit comprises two or more first conductive patterns spaced apart from each other, and the second conductive unit comprises two or more second conductive patterns spaced apart from each other, wherein at least a portion of the first conductive patterns and at least a portion of the second conductive patterns are electrically connected to each other.

2. The lithium secondary battery of claim 1, wherein the first conductive patterns and the second conductive patterns are arranged to partially overlap each other in a plan view to form a complete circuit in a sealed state of the first pouch case and the second pouch case.

3. The lithium secondary battery of claim 1, wherein at least one of the first conductive patterns and at least one of the second conductive patterns are exposed to an outside of the first pouch case and the second pouch case.

4. The lithium secondary battery of claim 1, wherein a distance between the first conductive patterns is from 1 mm to 10 mm, and a distance between the second conductive patterns is from 1 mm to 10 mm.

5. The lithium secondary battery of claim 1, wherein each of the first conductive patterns has a length ranging from 1 mm to 10 mm, and each of the second conductive patterns has a length ranging from 1 mm to 10 mm.

6. The lithium secondary battery of claim 1, further comprising a first insulator formed between the first conductive patterns, and a second insulator formed between the second conductive patterns.

7. The lithium secondary battery of claim 6, wherein each of the first conductive patterns, the first insulator, the second conductive patterns and the second insulator has a thickness ranging from 10 μm to 40 μm.

8. The lithium secondary battery of claim 1, wherein the first conductive unit is partially inserted into the first peripheral portion, and the second conductive unit is partially inserted into the second peripheral portion.

9. The lithium secondary battery of claim 8, wherein an insertion depth of each of the first conductive portion and the second conductive portion is from 5 μm to 10 μm.

10. The lithium secondary battery of claim 1, wherein the first pouch case and the second pouch case comprise a first accommodating portion and a second accommodating portion, respectively, which protrude to an outside of the pouch to accommodate the electrode assembly.

11. The lithium secondary battery of claim 10, wherein the first conductive unit and the second conductive unit at least partially surround perimeters of the first accommodating portion and the second accommodating portion, respectively.

12. The lithium secondary battery of claim 10, wherein the first pouch case and the second pouch case are sealed to each other through four sides of the pouch, and the first conductive unit and the second conductive unit extend along four sides of the first peripheral portion and the second peripheral portion, respectively, to surround perimeters of the first accommodating portion and the second accommodating portion.

13. The lithium secondary battery of claim 10, wherein the first pouch case and the second pouch case are sealed to each other through three sides of the pouch, and the first conductive unit and the second conductive unit extend along three sides of the first peripheral portion and the second peripheral portion, respectively, to partially surround perimeters of the first accommodating portion and the second accommodating portion.

14. The lithium secondary battery of claim 1, further comprising an electrode lead connected to the electrode assembly to be exposed to an outside of the pouch, wherein the electrode lead is fused together with the first peripheral portion of the first pouch case and the second peripheral portion of the second pouch case.

15. A battery system, comprising:

a plurality of battery cells, each of which comprises:

a pouch comprising:

a first pouch case comprising a first peripheral portion and a first conductive unit formed at the first peripheral portion; and a second pouch case comprising a second peripheral portion and a second conductive unit formed at the second peripheral portion, the second pouch case being sealed with the first pouch case; and an electrode assembly accommodated in the pouch; and a power supply applying a current to the first conductive unit or the second conductive unit from an outside of at least one battery cell of the plurality of battery cells, wherein the first conductive unit and the second conductive unit are in contact with each other to form an electric circuit along the first peripheral portion or the second peripheral portion, and the current is circulated through the electric circuit, wherein the first conductive unit comprises two or more first conductive patterns spaced apart from each other, and the second conductive unit comprises two or more second conductive patterns spaced apart from each other, wherein at least a portion of the first conductive patterns and at least a portion of the second conductive patterns are electrically connected to each other.

16. The battery system of claim 15, wherein a ventilation generated in the battery cell is detected based on a change of the current in the electric circuit formed by the first conductive unit and the second conductive unit.

* * * * *